United States Patent [19]

Ferrill, Jr.

[11] 4,391,648

[45] Jul. 5, 1983

[54] PARTICULATE PIGMENT COMPOSITIONS

[75] Inventor: Richard M. Ferrill, Jr., Glens Falls, N.Y.

[73] Assignee: Ciba-Geigy Corporation, Ardsley, N.Y.

[21] Appl. No.: 274,972

[22] Filed: Jun. 18, 1981

Related U.S. Application Data

[63] Continuation of Ser. No. 179,849, Aug. 20, 1980, abandoned, which is a continuation of Ser. No. 966,439, Dec. 4, 1978, abandoned.

[51] Int. Cl.$^3$ .......................... C09C 1/20; C09C 3/68
[52] U.S. Cl. ................................ 106/308 M; 106/298
[58] Field of Search ............................ 106/298, 308 M

[56] References Cited

U.S. PATENT DOCUMENTS

| | | | |
|---|---|---|---|
| 3,437,503 | 5/1969 | Massam et al. | 106/308 M |
| 3,615,812 | 10/1971 | Clark et al. | 106/308 M |
| 3,755,244 | 8/1973 | Hart | 260/41 R |
| 3,778,287 | 12/1973 | Stansfield | 106/308 M |
| 3,867,332 | 2/1975 | Chimura et al. | 260/40 P |
| 3,922,232 | 11/1975 | Schela | 260/40 R |
| 4,001,035 | 1/1977 | Ito et al. | 106/308 M |
| 4,115,143 | 9/1978 | Batzar | 106/298 |
| 4,127,421 | 11/1978 | Ferrill, Jr. | 106/308 M |

FOREIGN PATENT DOCUMENTS

| | | | |
|---|---|---|---|
| 2001381 | 7/1971 | Fed. Rep. of Germany | 106/308 M |
| 2540355 | 3/1976 | Fed. Rep. of Germany | 106/308 M |
| 47-25131 | 10/1972 | Japan | 106/308 M |
| 7201176 | 8/1972 | Netherlands | 106/308 M |
| 569170 | 5/1945 | United Kingdom . | |
| 1392261 | 4/1975 | United Kingdom . | |

OTHER PUBLICATIONS

Chemical Abstracts, vol. 83 1975, Abstract #149007d of German 2341000.

*Primary Examiner*—Gary P. Straub
*Attorney, Agent, or Firm*—Harry Falber

[57] ABSTRACT

Pigmented compositions which are readily dispersible in oleoresinous vehicle systems are described. The compositions comprise by weight from 25 to 95% pigment and 5 to 75% of certain water-insoluble, friable thermoplastic polyester resins having a hydroxyl value of at least 50 mg/KOH per gram and a Ring and Ball softening point of at least 60° C. Particularly preferred polyester resins are the condensation products of an aromatic dicarboxylic acid, anhydride or ester, an aromatic monocarboxylic acid and an aliphatic polyol containing at least three hydroxymethyl groups.

5 Claims, No Drawings

PARTICULATE PIGMENT COMPOSITIONS

This is a continuation of application Ser. No. 179,849 filed on Aug. 20, 1980, now abandoned which in turn is a continuation of application Ser. No. 966,439, filed Dec. 4, 1978, now abandoned.

This invention relates to readily dispersible solid colorants having broad compatibility with oleoresinous vehicle systems, and more particularly to particulate, non-agglomerating pigment compositions which are readily dispersible in industrial type oleoresinous vehicles and provide therewith colored films or coatings having outstanding gloss, hardness and durability.

It is known that pigments can be after-treated with organic substances to change the surface characteristics of the pigments. Substances which have been proposed include, among others, liquid, non-drying fatty acid modified alkyd resins (U.S. Pat. Nos. 2,479,836 to Hoback et al and 3,728,142 to Rudolph et al), diglycol terephthalates or linear oligomers of terephthalic acid and ethylene glycol (U.S. Pat. No. 3,607,335 to Belde et al), low melting polylactones having terminal hydroxyl groups (U.S. Pat. No. 3,754,956 to Durrant et al), and viscous carboxyesters having acid values up to about 140 derived from trimellitic acid and a fatty alcohol or a hydroxy terminated fatty acid ester (U.S. Pat. No. 4,028,128 to Robertson). Pigments which have been after-treated with more than about 10% by weight of the pigment of the above liquid, oily or viscous resins are sticky and agglomerating and require special handling and storage techniques. Further, the resulting pigment compositions are not sufficiently compatible with the wide variety of oleoresinous vehicles presently available to the trade to warrant broad commercial acceptance and hence are of limited utility.

The use of liquid pigment dispersions as colorants for paints and inks is also known and Stansfield et al describe in U.S. Pat. No. 3,778,287 dispersions of inorganic pigments, lakes or toners in organic liquids containing dissolved therein polyesters having acid values up to 100 derived from certain hydroxy-containing, saturated or unsaturated aliphatic carboxylic acids. While liquid colorants offer the distinct advantage of being more readily incorporated into the medium to be colored than dry pigments, their commercial significance is seriously limited due to the problems of handling and storing potentially hazardous liquid chemicals. Thus, from an economical and safety standpoint, it is desirable to have the colorants in a dry, storage stable form which is readily dispersible in a wide variety of coating media without detriment to any of the desirable properties of coatings produced therefrom.

Now, in accordance with this invention, it has been found that solid particulates pigment compositions which meet the above objectives, can be produced in a stable, non-agglomerating form and that such compositions exhibit excellent dispersibility characteristics in air drying, baking type and thermosettable oleoresinous vehicle systems and provide therewith colored films of outstanding gloss, hardness and durability. Accordingly, the present invention relates to a solid particulate pigment composition which is readily dispersible in oleoresinous vehicle systems and comprises by weight from 25 to 95% of at least one pigment and from 5 to 75% of at least one water-insoluble, friable thermoplastic polyester resin having a hydroxyl value of at least 50 mg. KOH/gram of resin and a Ring and Ball softening point of at least 60° C. The preferred compositions of this invention are pigment concentrates comprising from 30 to 85% and most preferably from 35 to 75% of pigment, from 10 to 70% and most preferably from 15 to 65% of the polyester resin, and from about 1 to about 15% and most preferably from about 3 to about 10% of a cationic surfactant or surfactant combination.

Pigments which can be used in accordance with this invention are any of the solid colorants normally used in the industry for the coloring of paints, inks or plastics. These include the colored inorganic and organic prime pigments, extender pigments, metallic pigments, the various finely-divided channel and furnace blacks and the like. The pigments can be in the form of dried lump, wet cake, a slurry of the pigment in water or a suitable organic solvent, or the pigment slurry resulting from its synthesis. Presscakes are preferred where possible as these avoid the aggregation that normally occurs during drying of the pigment. Typical pigments include the organic pigments such as the diarylide yellows, the phthalocyanine blues and greens, the quinacridone reds and violets, dioxazine violet, carbon black, and the like; and inorganic pigments such as the cadmium reds and yellows, the lead chromate colors including pure lead chromate as well as solid solutions containing lead chromate and lead sulfate and/or lead molybdate, iron oxide yellows and reds, titanium dioxide and the like.

The polyester resins employed in this invention are water-insoluble, non-crystalline thermoplastic polymers which are friable at room temperature, have a Ring and Ball softening point above about 60° C., preferably from about 65° to about 100° C., and contain hydroxyl functionality. The hydroxyl functionality of the resin is described herein as hydroxyl value, which value is the number of milligrams of potassium hydroxide which will neutralize the quantity of acetic anhydride required to acetylate one gram of resin. The polyesters of this invention have hydroxyl values of at least 50 and preferably from about 75 to about 150 and are formed in known manner by the condensation reaction of a dicarboxylic acid, anhydride or ester and a monocarboxylic acid with greater than an equivalent amount of an aliphatic polyol containing at least three hydroxymethyl groups. The dicarboxylic acid component can be a saturated or unsaturated aliphatic, alicyclic or aromatic acid, anhydride or ester and is preferably phthalic anhydride, o-phthalic acid, terephthalic acid, isophthalic acid or dimethyl terephthalate. The dicarboxylic acid component usually provides less than 50 mole % of the total acid components of the reaction product. The monocarboxylic acid component can likewise be aliphatic or aromatic and is preferably an aromatic acid such as benzoic acid, the lower alkyl substituted benzoic acids and most preferably the para substituted alkyl benzoic acids wherein the alkyl group contains 1 to 6 carbon atoms. Particularly preferred is p-t-butyl benzoic acid. The aliphatic polyols are the tri or higher polyols containing at least three hydroxymethyl groups and preferably are trimethylol ethane, trimethylol propane, pentaerythritol, dipentaerythritol or tripentaerythritol. The condensation reaction is preferably carried out by heating the acid and alcohol components to temperatures in excess of about 150° C. in the presence of a small amount of an acid catalyst such as an organic sulfonic acid or a basic catalyst such as a metal oxide, and the reaction is continued until a product is obtained having a relatively low acid value, usually less than about 15. The acid value of the resin is the number of milligrams of potassium hydroxide required to neutralize one gram of the resin.

Optionally, and such is usually preferred, the composition can also contain a small amount, as for example, from about 1 to about 15% and preferably from about 3 to about 10% by weight of the composition of a water-insoluble, oil-soluble cationic surfactant or surfactant combination to enhance pigment dispersion. Preferred cationic surfactants are the substituted tertiary amines which are heterocyclic tertiary amines such as the alkyl imidazolines and oxazolines, the polyethoxylated tertiary amines, primary amines such as dehydroabietylamine and N-tallow trimethylene diamine and quaternary ammonium compounds such as the quaternary ammonium chlorides derived from adducts of $C_{12}$ to $C_{18}$ fatty acid amines and about 2 to 15 moles of ethylene oxide. One of the preferred imidazolines is 1-(2-hydroxyethyl)-2-n-heptadecenyl-2-imidazoline. The cationic surfactants are capable of forming water-soluble salts with various acids and being converted to a water-insoluble, oil-soluble form by reaction with alkali or anionic surfactants. As their acetate salts they are excellent surfactants with good solubility in water. The water-insoluble, oil-soluble form of such surfactants, as for example, complexes of the above amine surfactants with anionic surfactants are also useful provided a stoichiometric excess such as at least 10% and preferably 10 to 70% molar excess of the cationic surfactant is present. Typical anionic surfactants include sodium oleate, sodium laurate, sodium palmitate, sodium stearate, sodium naphthenate, sulfonated castor oil, sulfonated petroleum, sulfonated tall oil, sodium butyl naphthalene sulfonate, wood rosins and the like. Particularly useful are the commercially available anionic surfactants such as Tergitol 4 (the sodium sulfate derivative of 7-ethyl-2-methyl-4-undecanol), Igepon AC-78 (the coconut oil acid ester of sodium isethionate), Aerosol 22 (tetrasodium-N-(1,2-dicarboxyethyl)-N-octadecyl sulfosuccinamate), the sodium salt of hydrogenated wood rosin and the sodium alkyl aryl sulfonates.

The choice and amount of surfactant will, of course, vary depending upon a number of factors which include the HLB value of the surfactant or surfactant combination and the surface characteristics of the pigment. Generally, when present, the amount of surfactant will range from about 1 to about 15% and more preferably from about 3 to about 10% by weight of the composition, and the amount will be such that the resin to surfactant weight ratio is at least 2:1 and preferably within the range from about 2.5:1 to about 6:1.

The compositions of this invention can be formed in any convenient manner for intimately mixing a pigment with a normally solid resin, as for example, by ball milling in a dry state, pebble milling in aqueous medium, high speed stirring in the presence of a solvent for the resin, and the like, and then removing any aqueous medium or solvent. Conveniently, the compositions are prepared by forming an aqueous dispersion of the pigment, preferably by stirring the pigment in water in the presence of a water-soluble or water-dispersible cationic or anionic surfactant which is convertible to an oil-soluble, water-insoluble form, adding the resin to the aqueous dispersion, agitating the aqueous pigment-resin slurry at a temperature above the softening temperature of the resin, usually at about 5° to about 35° C. above the softening point of the resin, until the pigment transfers from the aqueous phase to the resin phase and an essentially pigment-free water phase is formed, adjusting the temperature of the slurry to a range at which the resin is a solid and recovering the resulting product. If granules are preferred, and such is usually the case when dealing with finely divided pigments which tend to be dusty in nature, the temperature of the agitated pigment-resin slurry is adjusted to a range above the softening point of the resin which provides a sufficiently high resin viscosity to achieve controlled coalescence of the particles and granulation in the desired particle size range, cooling water is added to adjust the temperature to the desired range or heating is discontinued and the slurry is permitted to cool slowly to below the softening point of the resin. Optionally, the resin can be added as a solution in an organic solvent and the pigment flushed from the aqueous phase to the resin phase by precipitating the surfactant or by removal of the solvent to form a colored non-aqueous phase in the form of small pigment granules.

Recovery of the product is conventional. For example, the slurry can be centrifuged or dewatered by running the batch through any suitable type of filtering apparatus such as a filter press, screen, etc. and the partially dewatered product can then be washed and dried using tray driers, vacuum driers, etc. Recovery can also be accomplished conveniently by spray drying or drum drying. Prior to or following drying, the product can be ground to a powder form, if desired.

The particulate pigment compositions of this invention are of exceptionally high quality and uniformity, are readily dispersible in oleoresinous vehicle systems and provide with such systems enamels which give films or coatings of outstanding color strength, gloss and transparency. They are ideally suited for use in industrial type oleoresinous vehicles such as the conventional air drying alkyd enamels, the baking type alkyd-melamine enamels and the thermosetting type acrylic-melamine enamels, with which they provide films or coatings of outstanding gloss, hardness and durability.

Having described the invention generally, the following examples are given to illustrate specific embodiments thereof. All parts and percentages are by weight unless otherwise specified.

EXAMPLE 1

A vessel equipped with an agitator and heating means was charged with light chrome yellow pigment presscake containing 224 parts (dry basis) of Pigment Yellow 34 (CI No. 77603) and sufficient water to provide a charge equal to 1660 parts by volume. The agitator was turned on, and the charge was heated to 55° C., following which time 9.6 parts of a coconut oil ester of sodium isethionate (0.023 equivalent of anionic surfactant), a sufficient amount of a 5% aqueous sodium carbonate solution to adjust the pH of the slurry to 7.0 and 72.0 parts of a powdered aromatic polyester resin were added to the slurry. Agitation was continued while maintaining the temperature of the slurry at 55° C., for 5 minutes. The polyester resin had a softening point (Ring and Ball method) of about 82° C., an acid value of about 14 and a hydroxyl value of about 110 and was prepared by the condensation reaction of 0.9 mole o-phthalic anhydride and 2.3 moles of p-t-butyl benzoic acid with 1.7 moles of trimethylol ethane. Next 48.0 parts of an aqueous solution containing 12.0 parts of dehydroabiethylamine (0.038 equivalent of cationic surfactant) and 2.4 parts of glacial acetic acid were added, the pH of the slurry was adjusted to 6.5, and the slurry was heated to 90° C. and maintained at 90° to 95° C. with agitation for 2 hours. Water at 25° C. was added to adjust the volume to 3500 parts and the slurry was agitated for an additional 2 minutes. The batch was then run out onto a 40 mesh screen and the dewatered material was dried in an oven at 70° C. The product was 235 parts (73.8% yield) of a non-sticky granular pigment composition containing about 70.5% of the lead chromate, 22.7% of the polyester resin and 6.8% of the surfactant combination, based on the weight of the composition. The granules were non-dusting, essentially spherical, free-flowing particles, the majority of which had a diameter between about 1 and about 2 millimeters.

The dispersibility characteristics of the pigment composition of this example were evaluated in an air-drying alkyd enamel as follows. A yellow enamel paste formulation was prepared by stirring 170.2 parts of the granules of this example with 47.2 parts of a commercial soya-linseed, medium oil alkyd resin (Aroplaz 1445-M50) and 32.8 parts of mineral spirits for 15 minutes using a small Cowles dispersing blade at 5000 rpm, adding 306 parts of sand (20-30 mesh) and continuing stirring for an additional 15 minutes using a sand mill type impeller blade. Following removal of the sand, the paste gave a Hegman gauge reading greater than 7. An enamel was produced from the above paste by stirring 68.6 parts of the paste with 54.9 parts of the Aroplaz resin, 25.3 parts of mineral spirits, 1.0 part of lead drier and 0.2 part of cobalt drier until uniform and adjusting the viscosity to 20-25 sec., #4 Zahn cup. The enamel was then sprayed onto standard test panels (size 3×9") to give a coating thickness of 0.7 mil and the panels were dried at room temperature for 48 hours. The resulting panels had a smooth, glossy, bright yellow surface. Exposure in a Cleveland humidity cabinet for 24 hours at 66° C. did not significantly alter the smooth, glossy surface of the panels. When the panels were tested in a Weatherometer, the color after 100 hours was a trace darker than a non-exposed panel, and was deemed fully satisfactory.

The pigment composition of this example was also evaluated in a baking-type alkyd-melamine enamel. In this evaluation, a yellow paste was prepared by 3-roll milling a mixture containing 62.8 parts of the granules of this example and 40.0 parts of a commercial general purpose, non-oxidizing short oil alkyd resin (Koppers Rezyl 99-5), using three passes. An enamel was prepared from the above paste by stirring 67.0 parts of the paste with 29.5 parts of the alkyd resin, 27.7 parts of a commercial fast curing, general purpose melamine-formaldehyde type resin (Koppers Melamine resin 61-8, 55% solid) and 24.9 parts of xylene and adjusting the viscosity to 20 seconds, #4 Ford cup using xylene. The enamel was then sprayed on test panels and the panels were baked for 30 minutes at 121° C. The resulting panels had a smooth, glossy, bright yellow surface which gave a Sward hardness test value of 48. Exposure in a Cleveland humidity cabinet for 24 hours at 66° C. did not significantly alter the smooth, glossy surface of the panels. When the panels were tested in a Weatherometer, the color after 100 hours was a trace darker than a non-exposed panel and was deemed fully satisfactory. Control panels were also prepared in the same manner as above except that the plate was formed using 46 parts of Pigment Yellow 34, and the enamel was formed using 56.1 parts of paste, 46.5 parts of the alkyd resin, 29.1 parts of the melamine resin and 17.4 parts of xylene to provide an enamel of equal solids content. Evaluation of the control panels in the same manner as above showed that the panel was smooth and glossy, that the Sward hardness test value was 20 and that the surface and color characteristics were not significantly altered by the humidity and Weatherometer tests.

EXAMPLE 2

The procedure of example 1 was repeated except that a molybdate orange pigment presscake containing 224 parts (dry basis) of Pigment Red 104 (CI No. 77605) was substituted for the light chrome yellow pigment presscake, 60.0 parts of the polyester resin were used and the final pH adjustment was to a value of 6.0. The product of this example (91.6% yield) was in the form of non-dusting, free-flowing granules containing 73.3% of the orange pigment, 19.7% of the polyester resin and 7.0% of the surfactant combination. When the granules were dispersed in the air drying alkyd enamel and coated panels were prepared therefrom and evaluated in the same manner as Example 1, the panels had a smooth, glossy, bright, red toned orange surface which was not significantly altered by the humidity test and which was only slightly darker after 200 hours of exposure in the Weatherometer.

The pigment composition of this example was also evaluated in a thermosetting type acrylic-melamine enamel as follows. An orange paste was prepared by 3-roll milling a mixture containing 61.4 parts of the granules of this example and 22.5 parts of a commercial acrylic resin solution (Acryloid AT-56, 50% solids) using three passes. An enamel was prepared from the above paste by stirring 55.9 parts of the paste with 37.2 parts of the acrylic resin solution, 24.8 parts of a commercial melamine-formaldehyde type resin (Uformite MM-47, 60% solids), 3.6 parts of an aromatic petroleum solvent (Solvesso 100), 4.9 parts of butanol and 19.6 parts of xylene and adjusting the viscosity to 20 seconds, #4 Ford cup using xylene. The enamel was then sprayed on test panels and the panels were heated for 30 minutes at 121° C. Control panels were also prepared in the same manner except that the paste was formed using 45 parts of Pigment Red 104, and the enamel was formed using 45 parts of the paste, 57.6 parts of the acrylic resin solution, 26.0 parts of the melamine-formaldehyde resin, 3.6 parts of the aromatic petroleum solvent, 3.6 parts of butanol and 10 parts of xylene to provide an enamel of equal solids content. Visual comparison of the test panels (prepared with the enamel containing the pigment composition of this example) and the control panels showed that the test panels were more deeply colored, and slightly less glossy than the control panels. The Sward hardness test value for the test panels was 44, as compared with 28 for the control panel.

EXAMPLE 3

A vessel equipped with agitator and heating means was charged with 1600 parts by volume of a slurry containing 85.5 parts (dry weight) of copper phthalocyanine Pigment Green 7 (CI 74260) and water, agitation was commenced and the slurry was heated to 55° C. Next, 38.0 parts of an aqueous solution containing 30% of the commercial anionic surfactant Alkanol WXN (a sodium alkyl aryl sulfonate) were added, the pH was adjusted to 6.0 using dilute acetic acid and agitation was continued for 30 minutes at 55° C. Next, 114.0 parts of the polyester resin of Example 1 were added to the slurry, agitation was continued for 5 minutes at 55° C., 80.8 parts of an aqueous solution containing 10.1 parts of the commercial cationic surfactant Duomeen T (N-tallow trimethylenediamine) and 7.3 parts of 100% acetic acid were added gradually and the pH was adjusted to 7.1 using a dilute solution of sodium carbonate. The slurry was heated to 90° C. and agitated for 2 hours at 90°-95° C., and then cold water was added to reduce the volume to 3500 parts. Following run out of the slurry onto a 40 mesh screen and drying of the resulting granules, the product of this example was 154 parts (70% yield) of free-flowing, non-dusting granules containing 38.7% of pigment, 51.7% of the polyester resin and 9.7% of the surfactant combination, based on the weight of the product.

The dispersability characteristics of the pigment composition of this example were evaluated in a vinyl lacquer as follows: A green paste formulation was prepared by stirring 21.4 parts of the granules of this example with 75 parts of a coating solution containing 35% of a vinyl chloride-acetate copolymer (86:14, weight ratio), 32.5% of xylene and 32.5% of methyl ethyl ketone for 30 minutes using a small Cowles dispersing blade at 5000 r.p.m. and gradually adding 33.5 parts of a solvent mixture of xylene and methyl ethyl ketone (50:50) over the 30-minute period. A lacquer was produced from the above paste by stirring 43 parts of the paste with 70.1 parts of the solvent mixture and 2.6 parts of dioctyl phthalate for 30 minutes. The lacquer gave a Hegman gauge reading of 7½ and upon microscopic examination showed that dispersion quality was excellent and that essentially all of the pigment particles were below 2 microns in size. When the lacquer was drawn-down on aluminum coated paper to a film thickness of 1.5 mil, the film had good color intensity and was exceptionally bright and transparent.

A control lacquer was prepared as above except that 8.3 parts of a commercial Pigment Green 7 toner and 13.1 parts of the polyester of Example 1 were substituted for the 21.4 parts of the granules of this example. The control lacquer gave a Hegman gauge reading of 6 and upon microscopic examination showed a very large number of particles in the size range of 10–25 microns. The draw-down on aluminum possessed a color intensity substantially equal to that of the test lacquer but was considerably less bright and less transparent.

What I claim and desire to protect by Letters Patent is:

1. A solid particulate granular pigment composition which is readily dispersible in oleoresinous vehicle systems and consists essentially of from 25 to 95% by weight of at least one pigment; from 1 to 15% of a cationic surfactant or blend of surfactants; and from 5 to 75% of a water-insoluble, non-crystalline, friable, thermoplastic polyester resin having a hydroxyl value of 75-150 mg. KOH/gram of resin and a Ring and Ball softening point of from about 65° to 100° C. which polyester resin is the condensation product of phthalic anhydride, p-tert. butylbenzoic acid and trimethylol ethane.

2. The composition of claim 1 wherein the pigment is an inorganic pigment.

3. The composition of claim 2 wherein the pigment is a lead chromate-containing pigment.

4. The composition of claim 1 wherein the pigment is an organic pigment.

5. The composition of claim 4 wherein the pigment is a copper phthalocyanine pigment.

* * * * *